United States Patent [19]
Lynn et al.

[11] Patent Number: 6,093,481
[45] Date of Patent: Jul. 25, 2000

[54] INSULATING SHEATHING WITH TOUGH THREE-PLY FACERS

[75] Inventors: Gregory W. Lynn, Clearwater; Wayne E. Laughlin; James M. Elstun, both of St. Petersburg, all of Fla.

[73] Assignee: Celotex Corporation, Tampa, Fla.

[21] Appl. No.: 09/035,955

[22] Filed: Mar. 6, 1998

[51] Int. Cl.[7] .................................................. B32B 7/00
[52] U.S. Cl. .................... 428/217; 428/317.9; 428/319.7; 428/319.9; 428/543; 428/910
[58] Field of Search ........................................... 428/217

[56] References Cited

U.S. PATENT DOCUMENTS

| | | | |
|---|---|---|---|
| 4,438,166 | 3/1984 | Gluck et al. | 428/113 |
| 4,496,625 | 1/1985 | Snider et al. | 428/318.4 |
| 4,555,418 | 11/1985 | Snider et al. | 427/373 |
| 4,572,865 | 2/1986 | Gluck et al. | 428/309.9 |
| 4,764,420 | 8/1988 | Gluck et al. | 428/317.7 |
| 4,828,897 | 5/1989 | Staneluis et al. | 428/71 |
| 4,925,719 | 5/1990 | Staneluis et al. | 428/71 |
| 4,940,632 | 7/1990 | Nicola et al. | 428/318.4 |
| 5,089,189 | 2/1992 | Staneluis et al. | 264/45.3 |
| 5,134,014 | 7/1992 | Zaima et al. | 428/186 |
| 5,143,768 | 9/1992 | Wilderman et al. | 428/68 |
| 5,254,301 | 10/1993 | Sessions et al. | 264/46.2 |
| 5,254,402 | 10/1993 | Okubo et al. | 428/317.7 |
| 5,300,361 | 4/1994 | Vowinkel et al. | 428/304.4 |
| 5,332,621 | 7/1994 | Schmidt et al. | 428/318.4 |
| 5,352,510 | 10/1994 | Laughlin et al. | 428/304.4 |
| 5,437,924 | 8/1995 | Decker, III et al. | 428/318.4 |
| 5,466,317 | 11/1995 | Lause et al. | 156/79 |
| 5,506,048 | 4/1996 | Bussey, III et al. | 428/319.3 |
| 5,527,602 | 6/1996 | Eisen et al. | 428/319.7 |
| 5,532,055 | 7/1996 | Igarashi et al. | 428/318.6 |
| 5,576,080 | 11/1996 | Sugimoto et al. | 428/36.5 |
| 5,610,207 | 3/1997 | de Simone et al. | 523/218 |
| 5,627,219 | 5/1997 | Ogawa et al. | 521/99 |
| 5,633,063 | 5/1997 | Lause et al. | 428/71 |
| 5,641,564 | 6/1997 | Thary | 428/314.2 |
| 5,695,870 | 12/1997 | Kelch et al. | 428/318.4 |
| 5,698,304 | 12/1997 | Brandon et al. | 428/215 |
| 5,735,092 | 4/1998 | Clayton et al. | 52/309.9 |
| 5,891,563 | 4/1999 | Letts | 428/318.4 |

OTHER PUBLICATIONS

Baitinger, S.A. et al., "Barrier Packaging Technology—A New Approach to the Thermal Aging Problem of Rigid Foam Insulation", 30th Annual Polyurethane Technical/Marketing Conference, Oct. 15–17, 1986; 5 pages.

*Primary Examiner*—Ellen M. McAvoy
*Attorney, Agent, or Firm*—Charles W. Vanecek

[57] ABSTRACT

A method for continuously manufacturing an insulation board by facing a foam-forming composition with one or two facing sheets to form a singly or doubly faced composite, at least one sheet comprising either a tough polymeric layer or a laminate of a tough polymeric layer with at least one other facing material, the tough polymeric layer of at least one sheet facing to the outside of the composite, and foaming and curing the faced foam-forming mixture to produce an insulation board having an exceptional hardness and puncture resistance.

6 Claims, 3 Drawing Sheets

6,093,481

INSULATING SHEATHING WITH TOUGH THREE-PLY FACERS

BACKGROUND OF THE INVENTION

1. Field of the Invention

This invention relates to laminates and foam filled sheet products, both decorative and structural, and more particularly it relates to structurally rigid, optionally glass fiber reinforced, sheets of foam, which are particularly useful in thermal insulating applications. It also relates to a method for forming such a product.

2. Description of the Prior Art

Laminated rigid foam panels are widely used in the building and construction industry as sound and thermal insulating materials and as non-load bearing structural members. These laminated articles having a core of rigid foam can be made continuously or batchwise in a mold. The process of continuous or semicontinuous lamination usually involves deposition of a foam-forming plastics mixture onto a facing sheet(s) and bringing a second sheet(s) into contact with the mixture before it sets and sometimes before it foams.

The facing sheet(s) reduce the risk of physical damage to the foam and can aid significantly in maintaining the insulation value of the foam. Facers commercially used to protect foam products include aluminum foil, felt, glass and kraft paper in monolayers or laminates. Conveniently, both for economy and ease of handling, the facing sheets are often made of relatively inexpensive flexible materials, such as kraft and aluminum foil, which can be fed from rolls.

While use of impermeable aluminum foil provides an especially high insulation value, a disadvantage associated with its use alone as a facer stems from its fragility, which can result, e.g., in foil breakage during foamboard manufacture. While improved facer toughness can be achieved through the use of fibrous facers, such as conventional medium or heavy kraft papers or glass mats, these facers are no match for aluminum foil at providing a barrier against gas penetration. The porosity of fibrous facers allows excessive exposure of the foam material to air with the consequent opportunity for air infiltration into the foam. As is well known in the industry, the thermal conductivity (k-factor) of insulating boards containing fluorocarbon gas is substantially increased where some means is not provided to prevent such air infiltration into the cells of the foam insulation.

It would be highly desirable if a foam insulation board could be produced with facers which have outstanding toughness, surpassing conventional facing materials, and contribute overall good properties to the foam board.

OBJECTS OF THE INVENTION

It is accordingly an object of the present invention to produce a rigid foam insulation board having facers which are tough, lightweight, and highly insulating.

It is another object of the invention to provide a tough and flexible material which can be fed from a roll in both free and restrained rise processes to form a facing for a rigid foam insulation board.

It is a further object of the invention to produce a rigid foam laminate whose facing contributes to a combination of advantageous properties for building constructions, particularly for the laminate's use as a foam sheathing.

It is yet another object of the invention to provide for the high speed production in a simple and economical manner of foam laminates faced with especially tough sheets, particularly laminates of rigid polyurethane and polyisocyanurate foam, which exhibit overall good properties, including superior puncture resistance, extensibility, hardness and insulation value.

These and other objects and advantages of the present invention will become more apparent to those skilled in the art when the instant disclosure is read in conjunction with the accompanying drawings.

SUMMARY OF THE INVENTION

The above objects have been achieved in the method of the present invention which utilizes a laminate facing sheet comprising a polymeric layer or composite thereof having an outstanding toughness in the production of a faced foam structural laminate. The polymeric layer or composite facer is adhered to at least one major surface of a rigid foam insulation board. In a preferred embodiment, both major surfaces of the board are faced by the same or different tough facers of the invention.

One or both facers of the inventive board comprise an outer polymeric material characterized by exceptional toughness and resistance to puncturing during preparation and use of the board. After lamination to a rigid foam, the polymeric layer and especially its composites with one or more other materials contribute to the formation of a faced foam board having a combination of desirable properties, e.g., superior toughness, insulation value, impermeability, puncture resistance, durability, strength, resistance to breakage, flexibility, handling ease, ease of application, etc. The facing composites suitably comprise combinations of the outer polymeric layer with one or more of a large variety of conventional facing materials including fibrous materials such as glass fiber mats, kraft paper and asphalt-saturated felt, metals such as sheets of aluminum or steel, sheets or films of plastics, etc. In a preferred embodiment, the outer polymeric layer comprises a polyester film. Advantageously, the faced foam board of the invention has a hardness, as measured on the inventive faced side(s) by the Janka Ball Test (ASTM D1037), of at least 10, preferably at least 17, and more preferably at least 20, lb. Also, the inventive facer advantageously has a puncture resistance, as measured by ASTM D4830, of at least 10, preferably at least 17, and more preferably at least 20, psi.

The laminating method is suitably carried out by bringing at least one such tough facing sheet into contact or close proximity with a foam-forming mixture on a conveyor, and thereafter conveying together the composite of sheet and foamable mixture and foaming the mixture to produce the foam laminate of the invention.

The facing sheet is supplied in continuous form from a roll. The sheet is sufficiently flexible so that it can be readily wound on the roll, but it still possesses marked toughness making it especially resistant to damage during foam laminate production and subsequent utilization in end use applications in the construction market. It is a particular advantage that lightweight foam laminate of the present invention can be readily produced using relatively thin, flexible facing sheets which can be fed from rolls in the same way as conventional facing sheets of the prior art.

The facing sheet in rolled form is rotatably mounted on a stand from which it is unrolled to be brought into contact with a foam-forming composition. Foamable plastic materials which may be used in the production of the laminated articles of the invention may be any such materials described in the prior art. Of especial interest are foam cores consisting of an isocyanate-based foam material, including polyurethane and polyisocyanurate foams.

BRIEF DESCRIPTION OF THE DRAWINGS

The invention will now be described with reference to the accompanying drawings in which.

DETAILED DESCRIPTION OF THE INVENTION

Figure 1:
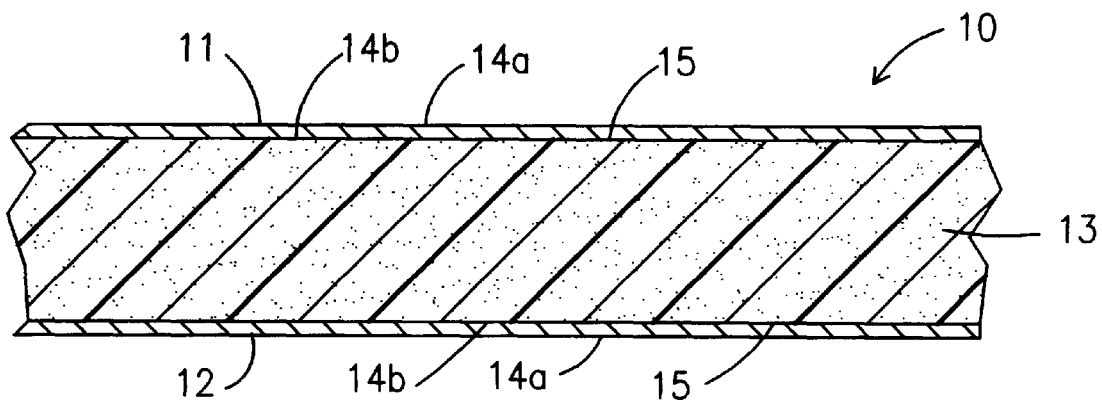
FIG. 1 is an enlarged, fragmentary, cross-sectional view of a foam board of the invention faced on both major surfaces by a monolayer.

Referring to FIG. 1, there is shown a faced insulation board 10 of this invention having outer facing sheets 11 and 12, at least one being formed of a polymeric layer or film of the invention. The inventive facing sheet may be a thermoplastic polymer or polymeric mixture and possesses a combination of properties needed for protection of the rigid foam core 13 in accordance with the present invention. The properties include good chemical and physical stability, high mechanical strength, durability, heat and chemical resistance and thermal insulation properties. Where one of the facing sheets is a non-inventive type, this sheet may be any conventional foam facer which supports the enhanced board properties contributed by the inventive facer. In a preferred embodiment, each of facing sheets 11 and 12 is about 0.3–5 mils thick.

The polymeric layer may be cross-linked or non-cross-linked. The polymer may be non-oriented, uniaxially oriented, or biaxially oriented. Polymers having biaxial orientation are especially effective. A preferred layer comprises a polymer composed of polyester groups as main recurring units or a polymeric mixture containing such polymer.

Polymeric layer(s) 11 and/or 12 may be modified by additives to meet particular requirements. Such additives include fillers, pigments or colorants, heat stabilizers, antioxidants, water-repellants, ultraviolet stabilizers, fire retardants, impact modifiers, processing aids and lubricants. Some suitable pigments and fillers are titanium dioxide, calcium carbonate, kaolin clay, silica and talc. A coating(s) 14 may be applied to the outside (14a) and/or inside (14b) of the polymeric layer. Coatings can provide weather resistance, e.g., protection against UV light, high humidity, salt spray, etc. Also, modification by coloring or printing of the polymeric layer serves to control the passage of light through it and to distinguish it. For example, a coating such as ink, which beneficially provides scuff resistance and/or UV protection, serves as an excellent coating 14a.

Coating also can be used to increase the gas barrier properties of the layer. Examples of such coatings are organic types, such as PVDC, and inorganic types, such as clay nanoplatelets. In a preferred embodiment, metals, such as silver, steel, and aluminum, are deposited on the polymeric layer. Aluminum is a preferred metal. The deposited metal may be formed on one or both surfaces of the polymeric layer. After deposition, the surface of the deposited metal may be treated for various purposes. For example, an effective oxygen barrier is a polymer layer consisting of a metallized (aluminum) polyester film coated with a UV and scratch resistant oxidation barrier.

The attachment of facing sheets 11 and 12 to the rigid core 13 may be facilitated by any adhesive material or other fastening aid (e.g., adhesion promoter) 15 known for use in binding plastic films or other facers in laminates and foams. The adhesive may be a thermoplastic or curable thermoset polymer. Examples of adhesive material 15 are olefin polymers and random, block and graft copolymers of ethylene and an acid comonomer selected from ethylenically unsaturated mono-and polycarboxylic acids and acid anhydrides and partial esters of such polycarboxylic acids. Other useful materials include urethanes, copolyesters and copolyamides, styrene copolymers such as styrene/butadiene and styrene/isoprene polymers, epoxies, acrylic polymers, etc. Adhesion can also be effected without use of any such adhesive agents.

In a preferred embodiment of the foam board of the invention, the polymeric layer is used in combination with one or more inner or outer facing sheets to form a multi-layered facer. This multi-layered laminate can be used on one or both sides of the foam board. The rigidity, and other properties, e.g., impermeability, toughness, impact resistance, and insulation value, of the foam board can be significantly improved by thus facing the rigid foam with a composite laminate or laminates. Advantageously, one or more of the co-facing sheets have a lower oxygen transmission rate than that of a conventional facing sheet such as a glass fiber mat.

The inventive foam board may be faced on one side by a monolayer and on the other side by a multi-layered facer, provided in a preferred embodiment that at least one tough polymeric layer is exposed on the outside of a major surface of the board. The tough polymeric material may also be used as the innermost layer or a mid-layer of a multi-layered facer. More than one tough polymeric layer may be used in a composite laminate facing one or both of the major surfaces. One or both of the sides of the polymeric layer may be corona treated for enhanced adhesion of the facing sheet. The coating and lamination involved in the production of the mono- and multi-layered facers of the invention can be accomplished by following generally known procedures in the art.

Figure 2:
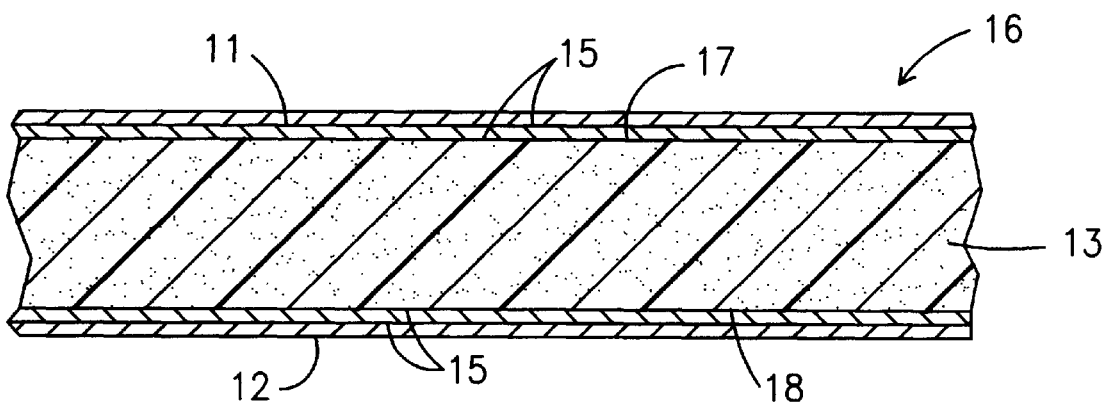
FIG. 2 is a similar view of a second embodiment of the inventive foam board faced on each major surface by a bilaminate.

Referring now to FIG. 2, there is shown a foam board 16 faced on both sides with bilaminates. Inner facers 17 and 18 of the bilaminates may be the same or different and are selectable broadly from conventional facing sheets. Sheet 17 and/or sheet 18 beneficially comprises a fibrous layer, a metallic layer, or another polymeric layer. The fibers of the fibrous layer may be virtually any fibrous material, either natural or synthetic. For example, the fibers may be asbestos, metal, cotton, hair, glass, or the filament forming synthetic organic polymers such as nylon, polyesters, rayon, cellulosics, or other known synthetic filamentary materials. The fibrous layer may be comprised of two or more fibrous materials, such as a composite of a paper and glass fiber sheet. Examples of preferred materials for use as the inner layer are a glass mat, kraft paper or a metallic sheet, especially aluminum.

Figure 3:
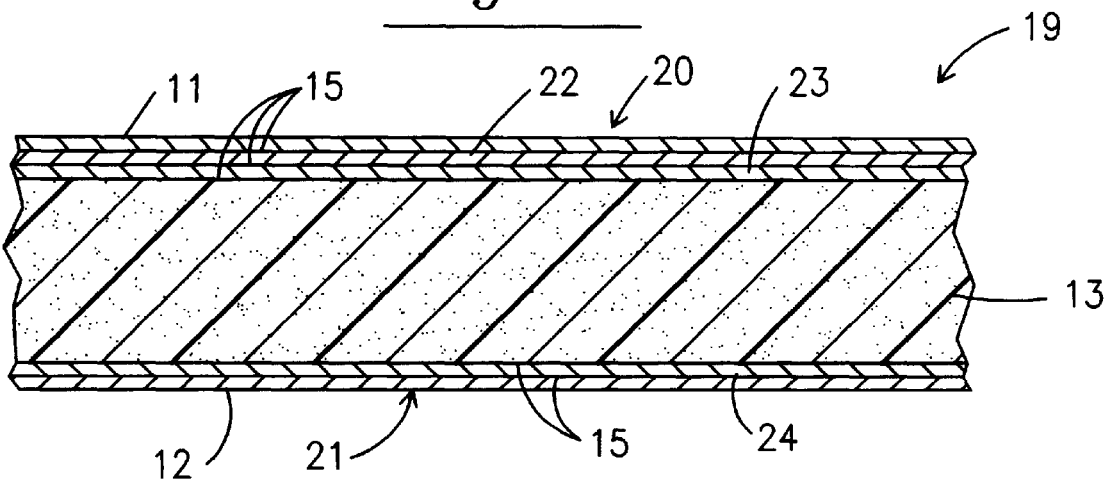
FIG. 3 is a similar view of a third embodiment of the inventive foam board faced on one major surface by a bilaminate and on the other by a trilaminate.

The laminated foam board 19 of FIG. 3 comprises another preferred composite faced by multi-laminates, specifically a trilaminate 20 and bilaminate 21. As in the case of foam board 16, the inner layers of board 19, i.e., layers 22 and 23 of the trilaminate and layer 24 of the bilaminate can be any facing sheet previously employed to produce foam boards, such as those mentioned above in connection with foam board 16. In a specific preferred embodiment, layers 23 and 24 comprise aluminum foil and layer 22 comprises kraft paper.

Figure 4:
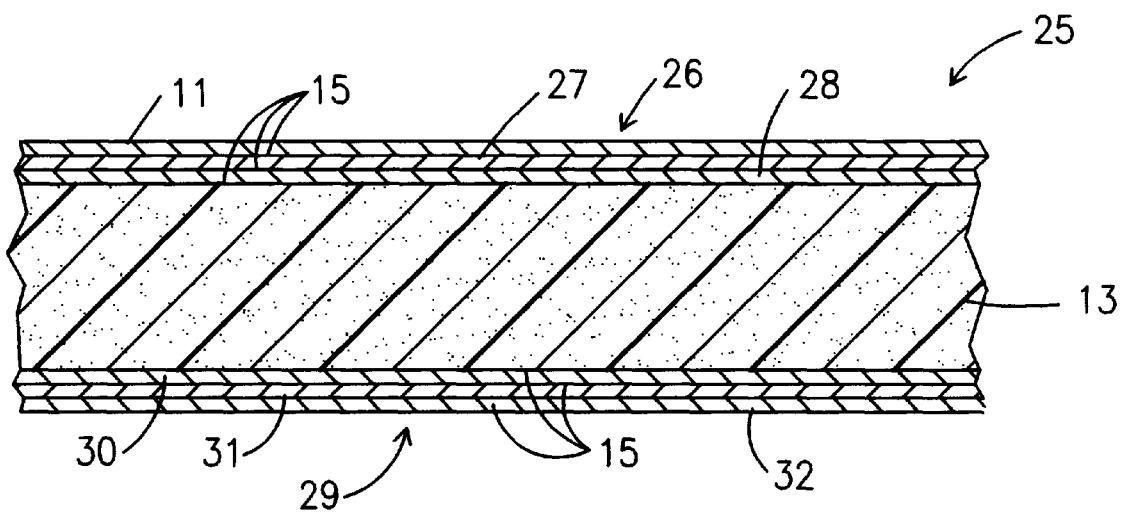
FIG. 4 is a similar view of a fourth embodiment of the inventive foam board faced on each major surface by a trilaminate.

The preferred foam board 25 of FIG. 4 is faced on each major surface by a trilaminate. One major surface is faced by trilaminate 26, which is composed of an outer, tough polymeric layer 11 (exposed side) and two inner layers 27 and 28. The trilaminate 29 on the other major surface has a tough polymeric layer 30 as its innermost layer and layers 31 and 32 to the outside of layer 30. Advantageously, mid-layers 27 and 31 are fibrous, preferably kraft paper, and layers 28 and 32 are metallic sheets, preferably aluminum foil.

The thickness of the inner and outer layers of foam boards 16, 19 and 25 may vary widely. For example, the thickness of polymeric layers 11, 12 and 30, each of which advantageously comprises a polyethylene terephthalate (PET) film, may be from about 0.3 mil to 5 mils, preferably about 0.5 mil to 2 mils. Each of layers 17, 18, 23, 24, 28 and 32 is suitably about 0.3 mil to 5 mils, preferably about 0.4 mil to 3.5 mils, thick and advantageously is a highly impervious material, such as a high barrier polymer or a metallic sheet, e.g., aluminum foil. Each of inner layers 22, 27 and 31 is suitably a fibrous sheet, such as a paper product. In especially useful embodiments, each of layers 22, 27 and 31 is a medium or heavy kraft paper. Foam boards 19 and 25 are producible using for layers 22, 27 and 31 sheet stock ranging from 20 lbs/3000 ft$^2$ paper to 200 lbs/3000 ft$^2$ cardboard. Especially useful are 30–150, more preferably 50 to 150, lbs/3000 ft$^2$ kraft papers.

The total thickness of the foam insulation boards formed in accordance with the invention may be from about 0.25 to 6.0, preferably 0.5 to 4.25 inches, of which the thickness of the facing sheets is generally from about 0.3 mil to 5 mils, and preferably from about 0.3 mil to 3 mils for the monolayer facers and about 0.3 mil to 4 mils for the laminated composites. The boards are typically 4 feet by 8 feet and about ½ to 1 in. thick.

The core of the faced product comprises a rigid foam. The invention is not limited to the nature of the foam material constituting the insulating core, provided that this insures heat insulation. The polymer compositions falling within the ambit of the invention may be broadly selected from any of those which can be blown into foam. The rigid cellular polymers of the invention desirably have a closed cell content of at least about 75%, and more preferably of at least about 85% of the cells. The polymer compositions may be thermoplastic or thermoset. Suitable polymers include polyurethane, polyisocyanurate, phenolic, rubber, polybutadiene, polyvinyl chloride, polyisoprene, urea-aldehyde, melamine-aldehyde, polystyrene, polyethers, polyimides, polysulphones, polycarbonates, polyetherimides, polyamides, polyesters, silicate resins, polyacetal resins, polyhydantoins, polyvinylidene chloride, polymethyl-methacrylate, polypropylene, polyethylene, polytetrafluoro-ethylene, cellulose acetate, epoxy, acrylonitrile-butadiene-styrene copolymer, silicone, and other copolymers and polymeric types. The blowing or foaming agents are employed in an amount sufficient to give the resultant foam the desired bulk density which is generally between 0.5 and 10, and preferably between 1 and 5 pounds per cubic foot.

Especially effective foam-forming compositions for use in the invention are those conventionally employed in forming rigid polyurethane foams, such as closed-cell PIR, PUR, and mixed PUR/PIR foams. Such foam-forming ingredients for the polyurethane and polyisocyanurate foams comprise polyisocyanates, polyfunctional, active hydrogen-containing compounds (e.g., polyester polyols), foaming agents, and catalysts, auxiliaries and additives as required (e.g., a surfactant). Included among such auxiliaries and additives are processing aids, viscosity reducers, flame retardants, dispersing agents, plasticizers, antioxidants, compatibility agents, fillers and pigments.

Figure 5:
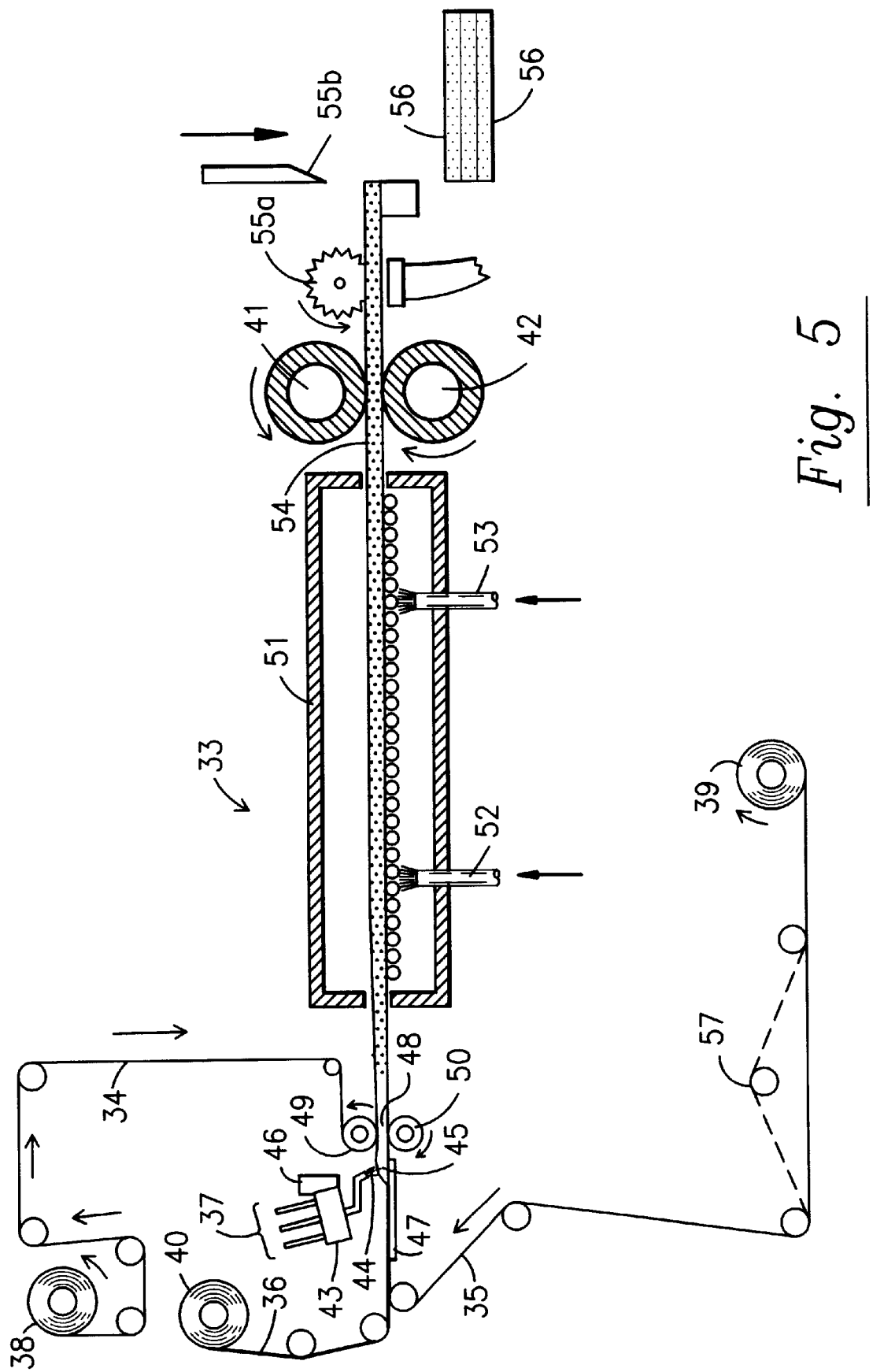
FIG. 5 is a schematic elevation of an apparatus suitable for practicing the process of the invention in a free-rise mode.

Referring to FIG. 5, there is shown schematically an apparatus 33 suitable for the continuous production of foam boards of the invention in accordance with a free rise process. Apparatus 33 includes means for advancing upper and lower facing materials or substrates 34 and 35, at least one of which is a tough facing sheet of the invention, and an optional reinforcing material or web 36 and means for applying a foam-forming mixture between the facing materials. The foam-forming ingredients are stored, pumped and metered by conventional equipment (not shown) and fed through a flexible conduit or conduits 37 for application on the production line. An advancing cover web having a surface nonadherent to the foam may be used in place of either facing material 34 or facing material 35.

As shown in FIG. 5, each of the upper and lower facing sheets 34 and 35 and the optional reinforcing web 36 are flexible materials which are in the form of continuous or semicontinuous sheets and are fed from supply rolls 38, 39 and 40, respectively. The apparatus 33 is also provided with pull rolls 41 and 42, and by virtue of rotation of these pull rolls sheets 34 and 35 and any reinforcing web 36 are pulled from their supply rolls and onward along the production line. Reinforcing web 36 is conveniently pulled to a position on top of lower sheet 35. A bowed and beneficially crowned roll, such as roll 57 of FIG. 5, may be provided in the feed path for either or both of sheets 34 and 35 to spread the inventive facing sheet where necessary and thereby prevent tension ridges. Roll 57 is prefereably located relatively close to the point of application of the foam-forming composition.

The foam-forming mixture, which advantageously is composed of polyurethane or polyisocyanurate foam forming chemicals, is delivered to a mixing head 43 and agitated therein. The mixed chemicals are then deposited from an applicator 44 onto advancing sheet 35 or web 36, where applicable. The chemicals can also be dispensed on sheet 34 or on both the upper and lower materials.

Various application devices, both stationary and moving, may be employed in depositing the chemicals. Even distribution of the foamable mix over the surface of the sheet material can be achieved by dispensing the chemicals from applicators having one or more delivery heads. In one preferred embodiment, applicator 44 comprises a nozzle which is reciprocated transversely of the underlying substrate to supply a stream of a liquid foamable mixture 45 uniformly there across. The back and forth movement of the mixing head and applicator is caused by a reciprocating means 46. In another embodiment involving the deposition of froth chemicals, the mixing head 43 deposits the foamable chemicals through an applicator capable of laying down a wide band of froth, with the applicator being advantageously oscillated a short distance from side to side.

As shown in FIG. 5, the start or upstream end of the production line beneficially includes a smooth-topped platform or bed 47 which extends from upstream of the deposition point of the foamable mixture to a point upstream of and adjacent the constricting nip 48 between closely spaced parallel rollers 49 and 50. The lower sheet and any associated reinforcing web 36 advantageously move downstream in a horizontal plane along the upper surface of bed plate 47 positioned as illustrated FIG. 5. Bed plate 47 is adjustably mounted so that it can be inclined from the horizontal to elevate its downstream transverse edge (adjacent nip 48) above its upstream transverse edge, and thereby achieve an improved control of the foam chemical bank.

Immediately downstream of the lay down point of the foamable chemicals, upper facing sheet 34 is brought into contact with the top surface of the chemicals. As illustrated in FIG. 5, this contact is suitably effected by passing upper sheet 34 around roller 49 and through nip 48. In another favorable embodiment of the invention, the foamable mixture can be dispensed through applicator 44 onto the exposed surface of the sheet 34 as the latter passes around roller 49. In any event, between rollers 49 and 50 the upper and lower facing sheets are brought together in surface-to-surface opposition relative to each other, with the foamable mixture and any reinforcing web 36 sandwiched in between. As the facing sheets are brought into closely spaced adjacency between rollers 49 and 50, the constriction at nip or gap 48 causes a rolling bank of foamable mixture to build up, whereby there is a surplus or backlog of material available to pass through the nip of the rolls. One or both of rollers 49 and 50 are advantageously vertically shiftable for control of the thickness of the facers and foamable mixture passing through the nip.

The nip 48 formed between the metering rollers 49 and 50 is accurately adjustable so as to insure contact of the foamable mixture with the facing sheets and any reinforcing material and cause the desired uniform distribution of the mixture, as well as uniform metering of the amount retained, as the facing sheets and optional reinforcing material advance beyond this point. To provide for this precise adjustment of the nip gap, the upper roller 49 is preferably mounted on an adjustable support which permits the distance between its axis and the axis of the lower metering roller 50 to be varied so that the nip between the rollers can be adjusted from a wide gap to almost a zero setting. This arrangement provides a high degree of control of the final thickness in the resulting foam board, with the foamable mixture being allowed to expand thereafter substantially freely to develop its natural rise profile. The metering rollers thus serve as a means for bringing the facing sheets 34, 35 into spaced conjunction, and for distributing the foamable mixture 45 therebetween, as well as a means for performing a final metering operation, supplementing the initial rough metering afforded by applicator 44.

The foam products of the invention can contain various reinforcement materials, such as the web 36 shown in FIG. 5. One or more of the reinforcing webs may be used. The reinforcing web(s) may be introduced below the foamable chemicals, as in FIG. 5, above the chemicals, or both below and above them. A fibrous reinforcement, especially fiberglass fibers, constitutes a preferred web material. For example, in a preferred embodiment the reinforcing web will be the type of expandable glass mat used in producing the structural laminate of U.S. Pat. No. 4,028,158, i.e., a thin mat of long, generally straight glass fibers. By generally following the method of foam reinforcement described in Example 1 of U.S. Pat. No. 4,028,158 and utilizing a foam-forming mixture having the consistency of the liquid foamable mixture of this example, the glass mat becomes distributed within the foam core. In accordance with this embodiment, a thin mat 36 of glass fibers is fed from roll 40 toward the nip between the two rotating metering rolls 49 and 50. By virtue of rotation of the pull rolls 41 and 42, reinforcing mat 36 is pulled from its roll, through the nip of the metering rolls and downstream to form an expanded reinforcement material in the resulting structural laminate.

When the foam-forming mixture deposited on the underlying substrate during the process is in the form of a froth, an included reinforcing web, such as the thin glass mat of U.S. Pat. No. 4,028,158, will be pushed under the influence of the expanding froth to a position adjacent and interior to its associated facing sheet. In this way, a reinforcing web(s) can be placed interiorly to the lower or upper facing sheet or to both, as described in U.S. Pat. No. 4,572,865, the disclosure of which patent with respect to such reinforced structural laminates is hereby incorporated by reference. Another reinforcement material which may be incorporated in the foams of the invention is the penetrable fibrous web or scrim disclosed in U.S. Application Ser. No. 08/801,074, filed Feb. 14, 1997, whose teachings with respect to such fibrous material are incorporated herein by reference. The foam product may be reinforced by a web or webs of one type or by a combination of types.

After passing between the nip of the two rollers 49 and 50, the faced composite passes into oven 51 and on along the generally horizontally extending production line, as shown in FIG. 5. Oven 51 provides an expansion zone for the foam-forming mixture. By varying the temperature of hot air from vents 52 and 53, the temperature within the oven 51 is maintained within the desired limits of 100° F. To 300° F., and preferably 175° F. To 250° F. The foam, under the influence of the heat added to the oven, cures to form faced foam plastic 54. The product 54 then leaves the oven 51, passes between the pull rolls 41 and 42, and is cut by side edge and length cutting means 55a and 55b into finite lengths, thereby forming discrete panels 56 of the product.

The present invention is further illustrated by the following example in which all parts and percentages are by weight unless otherwise indicated.

EXAMPLE

This example illustrates, by reference to FIG. 5 of the drawings, the production of insulation foam boards faced by the free-rise process of the invention.

A. ISOCYANURATE FORMULATION USED IN PREPARING FOAM CORE OF INSULATION BOARDS

The following isocyanurate formulation was used in preparing the foam core of the insulation boards.

| Foam-Forming Ingredients | Parts by Weight |
| --- | --- |
| Polymethylene polyphenylisocyanate having an equivalent weight of 138 | 62.8 |
| Aromatic polyester polyol having an equivalent weight of 135 | 21.7 |
| Blowing agent | 13.5 |
| Surfactant | 0.6 |
| Catalyst | 1.4 |

B. PRODUCTION AND PROPERTIES OF INSULATION BOARDS

Table I below shows for the production of each of boards A to C the composition of the top and bottom facers used and the glass weight additionally used in the case of board C. As shown in FIG. 5, top and bottom facers 34 and 35 were fed from rolls 38 and 39 toward the nip of metering rolls 49 and 50. The facers were pulled along the production line by pull rolls 41, 42. Top facing sheet 34 was passed around top metering roll 49, and bottom facing sheet 35 was passed into the gap 48 between the metering rolls.

Top facers 34 for each of boards A to C was a trilaminate whose uppermost layer in the production run was a polyester film so as to become exposed in the final product. Bottom facer 35 for each of boards A to C was also a trilaminate whose uppermost layer in the production run was a polyester film so as to become positioned contiguous with the foam core and unexposed in the final product. The reciprocating mixing head 43 deposited the foam-forming mixture on the lower facer in the case of all boards except for board C, in whose production a thin and expansible mat 36 of glass fibers arranged in layers was fed above the bottom facer, as shown in FIG. 5 and described in U.S. Pat. No. 4,028,158.

After being thoroughly mixed in mixing head 43, the above-mentioned foam-forming ingredients were discharged just upstream of the nip 48 of the metering rolls through tube 44 onto the lower facer 35 or mat 36, and the composite was then passed through the nip into oven 51. The distance between rolls 49 and 50 was preset to produce boards having the average thicknesses listed in Table I. Oven 51 was heated to provide a zone above vent 52 at a temperature of about 190° F., and a zone above vent 53 at about 210° F. In the oven, the foam-forming mixture expanded to a substantially uniform thickness. In the case of foam board C, the fibrous layers of mat 36 expanded with the foam. After leaving the oven, the product was cut into discrete panels.

Various properties of each of the resulting faced foam insulation boards A to C are reported in Table II below. The results of Table II reveal that the laminates of the invention possess a combination of desirable properties, including a superior hardness and puncture strength.

TABLE I

LAMINATE FACERS OF FOAM INSULATION BOARDS

| FOAM INSULATION BOARD | A | B | C |
|---|---|---|---|
| Top Facer Type | Coated Trilaminate[1] | Coated Trilaminate[1] | Coated Trilaminate[1] |
| Bottom Facer Type | Inverted Trilaminate[2] | Inverted Trilaminate[3] | Inverted Trilaminate[3] |
| Glass Weight (g/ft$^2$)[4] | — | — | 2.0 |

1. Coated Trilaminate = black ink coated 92 gauge 2-side corona treated PET film; casein/SBR latex adhesive; 30 lb natural kraft; casein/SBR latex adhesive; .00025"–.0003" soft aluminum foil; epoxy or acrylic washcoat (materials listed in sequence from exposed side of facer inwardly to foam core).
2. Inverted Trilaminate = epoxy or acrylic washcoat, .00025"–.0003" soft aluminum foil, casein/SBR latex adhesive; 30 lb natural kraft; casein/SBR latex adhesive; clear 48 gauge 1-side corona treated PET film (materials listed in sequence from exposed side of facer inwardly to foam core).
3. Inverted Trilaminate = epoxy or acrylic washcoat; .00025"–.0003" soft aluminum foil; casein/SBR latex adhesive; 25 lb natural kraft; casein/SBR latex adhesive; clear 48 gauge 1-side corona treated PBT film (materials listed in sequence from exposed side of facer inwardly to foam core).
4. Glass = continuous strand fiberglass mat weighing 2 g/ft$^2$.

TABLE II

PROPERTIES OF FOAM INSULATION BOARDS

| PROPERTY | FOAM INSULATION BOARD | | |
|---|---|---|---|
| | A | B | C |
| Thickness (in) | ½ | ½ | 1 |
| Core Density (lb/ft$^3$) | 1.72 | 1.71 | 1.71 |
| Compressive Strength (psi) | 16 | 18 | 19 |
| Flexural Strength, MD/TD (psi) | 140/130 | 83/132 | 67/65 |
| Impact-Janka Ball, Top-Bottom (lb) | 22–15 | 21–15 | 21–15 |
| Cold Lineal Change,[1] | | | |
| % length | 0.00 | 0.00 | 0.09 |
| % width | 0.00 | 0.03 | 0.07 |
| Puncture Strength, Top-Bottom (psi) | 29–18 | 28–16 | 25–14 |
| Water Absorption, (% Vol.) | 0.95 | 0.62 | 0.68 |
| Facer Adhesion, (28 days @ 158° F. + 95% RH) | Good | Good | Good |
| k-factor (BTU-in hr-ft$^2$-° F.), | | | |
| Initial 30 days @ 140° F. | 0.127 | 0.127 | 0.133 |

What is claimed is:

1. An insulating sheathing for use in building construction comprising:

a closed cell foam core of rigid foam selected from the group consisting of polyisocyanurate and polyurethane foams, the foam core having two opposed major sides;

a non-reflective three-ply facer facing one of the two opposed major sides of the foam core, the non-reflective three-ply facer comprising a top layer of black coated biaxially oriented polyester film, an intermediate layer of fibrous material, and a bottom layer of aluminum foil, the bottom layer of aluminum foil being adhered to said one of the two opposed major sides of the foam core;

a reflective three-ply facer facing the other of the two opposed major sides of the foam core, the reflective three-ply facer comprising a top layer of aluminum foil, an intermediate layer of fibrous material, and a bottom layer of biaxially oriented polyester film, the bottom layer of biaxially oriented polyester film being adhered to the other of the two opposed major sides of the foam core; and the non-reflective three-ply facer and the reflective three-ply facer each being about 0.3 mils to about 5 mils thick and the total thickness of the non-reflective three-ply facer, the foam core and the reflective three-ply facer being about 0.25 to about 6.0 inches.

2. An insulating sheathing as in claim 1 wherein the non-reflective three-ply facer and the reflective three-ply facer are each about 0.3 mils to 4 mils thick, and the total thickness of the non-reflective three-ply facer, the foam core and the reflective three-ply facer is about 0.5 to about 4.25 inches.

3. An insulating sheathing as in claim 2 wherein the intermediate layers of the non-reflective three-ply facer and the reflective three-ply facer are each selected from the group consisting of papers, cardboards, and glass mats.

4. An insulating sheathing as in claim 3 where the rigid foam is a polyisocyanurate foam having a closed cell content of at least about 75%.

5. An insulating sheathing as in claim 4 wherein the intermediate layer of each of the non-reflective three-ply facer and the reflective three-ply facer is kraft paper between 30–150 lbs/3000 ft$^2$.

6. An insulating sheathing as in claim 5 wherein the polyisocyanurate foam has a closed cell content of at least 85%, the major surfaces of the foam core are each about 4 feet by about 8 feet, and the total thickness of non-reflective three-ply facer, the foam core and the reflective three-ply facer is about ½ to about 1 inch.

* * * * *